United States Patent
Haywood et al.

(10) Patent No.: US 6,239,197 B1
(45) Date of Patent: May 29, 2001

(54) VACUUM DE-AERATED POWDERED POLYMER ADDITIVES

(75) Inventors: Russell Haywood, Northumberland; Paul Edward Inchley, Durham, both of (GB); Richard S. Rose, West Lafayette, IN (US)

(73) Assignee: Great Lakes Chemical Corporation, West Lafayette, IN (US)

( * ) Notice: Subject to any disclaimer, the term of this patent is extended or adjusted under 35 U.S.C. 154(b) by 0 days.

(21) Appl. No.: 09/420,438

(22) Filed: Oct. 18, 1999

Related U.S. Application Data

(60) Provisional application No. 60/130,744, filed on Apr. 23, 1999.

(51) Int. Cl.$^7$ ............................................ C08J 3/00
(52) U.S. Cl. ................................... 523/340; 528/502
(58) Field of Search ................................. 523/340

(56) References Cited

U.S. PATENT DOCUMENTS

| | | | |
|---|---|---|---|
| 3,373,229 | 3/1968 | Philpot et al. | 260/899 |
| 3,567,669 | 3/1971 | Georgiana et al. | 260/23.7 |
| 3,663,674 | 5/1972 | Holiday | 264/118 |
| 3,897,389 | 7/1975 | Touval | 260/45.75 B |
| 4,022,856 | 5/1977 | Maxey | 264/26 |
| 4,069,288 | 1/1978 | Barkhuff, Jr. et al. | 264/141 |
| 4,102,853 | 7/1978 | Kawamura et al. | 260/40 R |
| 4,182,799 | 1/1980 | Rodish | 521/98 |
| 4,243,579 | 1/1981 | Keogh | 260/45.7 R |
| 4,341,881 | 7/1982 | Kracklauer et al. | 524/176 |
| 4,377,506 | 3/1983 | Sprague | 252/609 |
| 4,530,880 | 7/1985 | Taniuchi et al. | 428/402 |
| 4,546,126 | 10/1985 | Breitenfellner et al. | 523/216 |
| 4,616,042 | 10/1986 | Avakian | 521/81 |
| 4,668,720 | 5/1987 | Kauth et al. | 524/86 |
| 4,849,134 | 7/1989 | Georlette et al. | 252/601 |
| 4,904,285 | 2/1990 | Yamada et al. | 55/191 |
| 5,219,986 | * 6/1993 | Cassata | 530/324 |
| 5,531,252 | 7/1996 | Derby et al. | 141/67 |
| 5,552,461 | * 9/1996 | Redd | 524/47 |
| 5,580,537 | 12/1996 | Sextl et al. | 423/335 |
| 5,593,619 | 1/1997 | Bottelberghe et al. | 252/609 |
| 5,650,485 | * 7/1997 | Sun | 528/483 |
| 5,718,880 | 2/1998 | Hijikata | 423/632 |
| 5,783,246 | 7/1998 | Wong | 426/594 |

FOREIGN PATENT DOCUMENTS

| | | |
|---|---|---|
| 2074489 | 7/1991 | (CA) . |
| 569 620 | 11/1975 | (CH) . |
| 1 219 380 | 6/1966 | (DE) . |
| 60-098999 | 6/1985 | (JP) . |
| 2122004 | 5/1990 | (JP) . |
| 10100144 | 4/1998 | (JP) . |
| WO 9111308 | 8/1991 | (WO) . |

* cited by examiner

*Primary Examiner*—Paul R. Michl
(74) *Attorney, Agent, or Firm*—Marshall, O'Toole, Gerstein, Murray & Borun

(57) ABSTRACT

Increased bulk density of powdered flame retardants, flame retardant synergists and other powdered polymer additives substantially improves the processing, dispersibility, and properties of the processed polymer. Processing improvements include faster processing, more homogeneous additive dispersion throughout the polymer, less swell, and reduction or elimination of drool. Formed parts containing the increased bulk density flame retardant and flame retardant synergists are more consistent with respect to density, wall thickness, and more homogeneous and consistent flame retardancy. Physical properties such as flammability test performance and/or impact strength are also enhanced.

20 Claims, No Drawings

VACUUM DE-AERATED POWDERED POLYMER ADDITIVES

CROSS-REFERENCE TO RELATED APPLICATION

This application is a continuation-in-part of U.S. Provisional Patent Application Ser. No. 60/130,744 filed April 23, 1999.

FIELD OF THE INVENTION

This invention relates to a method of increasing the bulk density of finely powdered polymer additives, particularly antimony trioxide and other solid flame retardants or flame retardant synergists. More particularly, the present invention relates to a method of improving the compounding speed and dispersibility when compounding finely powdered polymer additives into polymer melts; means for producing polymeric materials containing the finely powdered solid polymer additives; and the resulting polymeric materials.

BACKGROUND OF THE INVENTION AND PRIOR ART

Antimony trioxide and other powdered, solid flame retardants and flame retardant synergists have presented problems in handling and particularly in compounding the powdered flame retardants into polymers. A finer particle size solid polymer additive leads to better dispersion in a polymer matrix, and better dispersion equates to more efficient performance and improved polymer physical properties. Therefore, the solid polymer additives often have particle sizes reduced to less than 10 microns. Finely powdered polymer additives, however, present particular problems.

One problem of finely powdered polymer additives is dusting. The creation of dust involves loss of raw material, increased clean-up costs, and health concerns for those handling the solids. Another problem is bulk density. Finer solids tend to have decreased bulk density and increased packaging size, volume and cost.

The fluffy nature and low bulk density of finely powdered, polymer additive solids adversely affects additive flow properties, making them less compatible with solids which do not contain appreciable volumes of air. For example, low bulk density powders do not mix well with plastic pellets, resulting in poor homogeneity of the processed plastic containing these powders. More specifically, poor solids mixing homogeneity results in poor performance in flammability tests and poor physical properties in the final product.

A number of measures have been taken to overcome the problems of low bulk density fine powders. They all involve adding extra steps to the process of incorporating solid flame retardants and flame retardant synergists into polymers for the purpose of rendering the polymers less combustible.

One prior art approach to increasing the mixing homogeneity in the addition of low bulk density solids to polymers involves adding a liquid, such as a plasticizer, to the powder, prior to mixing the powder with the polymer. Another prior art approach involves blending a meltable carrier with the powder by means of heat and/or friction. Both approaches involve an additional step and incorporate an undesirable extraneous substance into the final polymer.

Blending the powder into the polymer in the form of a concentrate that can be diluted with more polymer to achieve the desired final concentration of powder additive is a common approach. It decreases dusting during the ultimate polymer processing step. However, it not only adds a costly additional step, but it also does not deal with the problem of poor mixing of a low bulk density powder and a polymer in forming the concentrate. In fact, the concentrate may have poorer homogeneity because a higher proportion of incompatible fine powder is added.

The approach described in U.S. Pat. No. 4,849,134 to solving these problems is cold compaction of the flame retardant and/or flame retardant synergist. The disadvantage of this method is that compaction (re-)agglomerates the fine particles. Unless subsequent polymer processing conditions result in complete breakup of coarse compacted (agglomerated) particles and dispersion into the polymer, the advantages of the fine particles are lost.

The process of vacuum de-aeration is known for other purposes, such as in processing cosmetics, food items, and thermoplastic resins, for example. Suitable process and equipment descriptions are found in U.S. Pat. Nos. 4,904,285 and 5,531,252, hereby incorporated by reference. However, vacuum de-aeration has not been used to increase the bulk density of flame retardants, flame retardant synergists, or other finely powdered polymer additives. Further, the prior art neither discloses nor suggests that increasing the bulk density of a finely powdered polymer additive improves processing speed of the polymer, better dispersion of the additive, and improved physical properties of the processed polymer.

Reducing the bulk density of flame retardants, flame retardant synergists, blends thereof, and other powdered polymer additives has significant value. These additives are included in an amount of about 1% to about 20%, often 10–20% by weight, of a finished polymeric article. Certain advantages of a lower bulk density polymer additive upon processing of one polymer, PVC, are referred to in U.S. Pat. No. 3,567,669. This patent discloses a high speed mixing process which requires a temperature of at least 170° C. Under these conditions, the PVC particles have a "slightly sintered or glazed surface". Solid additives are absorbed or adsorbed onto the polymer surface.

U.S. Pat. No. 3,663,674 discloses densification of poly α-olefins. Cited advantages of increased bulk density are improved handling characteristics and the lack of a thermal history prior to processing.

No mention is made of the effect of the bulk density of powdered additives upon the processability or properties of the polymer. Nor is there any mention of the use of flame retardants or flame retardant synergists. Based upon the teachings of the '669 and '674 patents, one would not expect that increasing the bulk density of powders, such as fillers or pigments, would enhance the processability, achieve better dispersion of the additive throughout the polymer, or enhance the properties of the processed polymer.

A novel, improved solution to these problems has been found through the use of high bulk density, low dusting solid flame retardants, flame retardant synergists, blends, and other compacted, powdered polymer additives which maintain their fine particle size and improve the efficiency of the compounding step, improve the dispersion of additive more homogeneously throughout the polymer, and improve one or more properties of the compounded polymer.

SUMMARY OF THE INVENTION

It has now been found that high bulk density flame retardants, flame retardant synergists, blends thereof and/or other finely powdered polymer additives enhance both the processability and one or more properties of the polymers into which they are incorporated.

One object of this invention is to provide a method of processing or compounding finely divided polymer additives into polymers, including forming concentrates, using relatively high bulk density, low dusting solid additives, such as flame retardants, and flame retardant synergists, or blends thereof which maintain their fine particle size.

Another object of this invention to provide flame retarded polymers which contain these high bulk density solids and blends wherein the flame retardant additive has a powder particle size such that at least 50% of the particles have an average particle size less than about 10 $\mu$m, preferably less than about 5 $\mu$m, and preferably having a mean particle size diameter less than about 2 $\mu$m, e.g., 1.0–1.5 $\mu$m, and has been increased in bulk density by at least about 50%, preferably at least about 100%, by vacuum de-aeration to provide low dusting solid additives during processing; better performance due to the incorporation of higher bulk density solids and the advantages of fine particle size; and increasing the speed of compounding and the dispersion of the finely powdered additives within the polymer.

The above and other objects and advantages of the present invention will become more apparent from the following detailed description of the preferred embodiments.

DETAILED DESCRIPTION OF THE PREFERRED EMBODIMENTS

High bulk density flame retardants, flame retardant synergists, blends thereof, and other finely powdered polymer additives, according to the present invention, include hydrated minerals, halogenated organic compounds, phosphorus-containing compounds, nitrogen-containing compounds, boron-containing compounds, zinc-containing compounds, antimony-containing compounds, and mixtures thereof. Commercially important flame retardants and/or flame retardant synergists of each type are well known to those skilled in the art.

Examples of hydrated minerals include alumina trihydrate and magnesium hydroxide. Examples of halogenated organic compounds include decabromodiphenyl oxide, decabromodiphenyl ethane, hexabromocyclo-dodecane, tetrabromobisphenol A, oligomers based upon tetrabromobisphenol A, brominated polystyrene, and tetrachlorophthalic anhydride.

Phosphorus-containing compounds are exemplified by ammonium polyphosphate, and melamine pyrophosphate, which are examples of nitrogen compounds as well. Examples of compounds which are useful as flame retardant synergists include zinc borate, antimony trioxide, and sodium antimonate.

Examples of finely divided polymer additives, in addition to flame retardants and flame retardant synergists, that can be vacuum de-aerated in accordance with the present invention include:

antimicrobial compounds—These include arsenic containing compounds as well as zinc pyrithione and 2-octyl-4-isothiazoline-3-one;

antioxidants—Types include hindered phenols such as butylated hydroxy toluene (BHT), phosphites—tris (para-nonylphenyl)phosphite is an example, phosphonites, lactones, hydroxyl amines, hindered amines, and thioesters;

antistatic agents—They include carbon black, graphite, metal powders, and surfactant types—quaternary ammonium salts, alkyl sulfonates, alkyl phosphates and their alkali metal salts such as sodium alkyl sulfonates, ethoxylated amines, and laurel amide;

blowing agents—In addition to mechanical types which are generally liquids or gases there are chemical blowing agents. Examples include azodicar-bonamides, inorganic carbonates, and polycarbonic acids;

colorants—These include pigments such as titanium dioxide, which may be heavy metal bases, organic, or metallized azo compounds, as well as dyes and optical brighteners;

coupling agents—Included in this group are silane coupling agents and maleated polyolefins;

heat stabilizers—These include the following metal based compounds: lead, tin, lead-barium, barium-cadmium, barium-zinc, and calcium-zinc;

light stabilizers—Types include benzophenones such as 2-hydroxy-4-methyl benzophenone, benzotriazoles such as 2-(2'-hydroxy-5' methylphenyl) benzotriazole, phenyltriazines, hindered amines, oxanilids, and nickel quenchers;

lubricants—Examples include metallic stearates such as zinc stearate, hydrocarbons such as waxes and polyethylenes, fatty acids and fatty alcohols such as carnauba wax; plasticizers—Included are phthalates like dioctyl phthalate (DOP), linear alcohols, aliphatic diesters, and phosphates such as triphenyl phosphate. Liquid plasticizers may be mixed with solids to give blends the characteristics of solid particles;

release agents—These include amide and ester types such as butyl stearate; and non-fibrous fillers—These include glass and ceramic, calcium carbonate, talc, clays, mica, wollastonite, and ground silica.

The preferred method of reducing bulk density according to this invention is vacuum de-aeration. It has been found that vacuum de-aeration of finely powdered polymer additives increases bulk density, processing (compounding) speed, and achieves excellent dispersion of the powdered additives throughout the polymer, much better than traditional compaction methods.

We have found that increased bulk density (by at least 50%) of powdered flame retardants, flame retardant synergists and other powdered polymer additives, preferably without further reducing the particle size, substantially improves the processing, dispersibility, and properties of the processed polymer. Processing improvements include faster processing, more homogeneous additive dispersion throughout the polymer, less swell, and reduction or elimination of drool. Formed parts containing the increased bulk density flame retardant and flame retardant synergists are more consistent with respect to density, wall thickness, and more homogeneous and consistent flame retardancy. Physical properties such as flammability test performance and/or impact strength also are enhanced.

EXAMPLE 1

Vacuum De-aeration of Antimony Trioxide

A sample of antimony trioxide having a measured bulk density of 816 g/L was subjected 160 g/cm$^2$ applied pressure and a vacuum of inches of mercury. The fmal bulk density of the sample measured 1584 g/L, an approximate doubling. In a separate trial, the applied pressure was 4 kg/cm$^2$, the vacuum 20 inches of mercury, and the resulting bulk density 2400 g/L. These results indicate that the vacuum de-aeration procedure is capable of increasing the bulk density of this sample to approximately 2–3 times the original bulk density.

EXAMPLE 2

Dispersion in PVC

The three antimony oxide samples of Example 1 were incorporated into polyvinyl chloride using a two roll mill.

Observation of the PVC after processing revealed that all three samples of antimony trioxide, including the two having a higher bulk density due to vacuum de-aeration, dispersed well and were free of agglomerated antimony trioxide.

EXAMPLE 3

Particle Size Comparison of Standard vs. Vacuum De-aerated Antimony Trioxide

Material produced at two plants, A and B were tested. Vacuum de-aerated material came from long runs (multiple tons). Therefore, the lots were different and some variation in particle size between standard and de-aerated would be expected.

| Particle Size | Mean | Std. Dev. | 10% < | 50% < | 90% < | 99% < |
|---|---|---|---|---|---|---|
| Standard Material ($\mu$m) A | 1.25 | 0.81 | 0.27 | 1.18 | 2.17 | 4.50 |
| Vacuum De-aerated ($\mu$m) A | 1.29 | 1.17 | 0.26 | 1.03 | 2.37 | 6.20 |
| Standard Material ($\mu$m) B | 1.36 | 0.94 | 0.31 | 1.23 | 4.98 | 6.24 |
| Vacuum De-aerated ($\mu$m) B | 1.21 | 0.86 | 0.28 | 1.10 | 4.93 | 6.31 |

A study of these data leads to the conclusion that vacuum de-aeration has no discernible effect upon particle size distribution of antimony trioxide.

EXAMPLE 4

Improved Processability of Polymer-Containing Vacuum De-aerated Antimony Trioxide Plant scale trials were performed. The objective of the trials was to evaluate how well vacuum de-aerated, compacted antimony trioxide would compound in comparison to non-compacted antimony trioxide products. The performance was evaluated according to the following criteria:
Dust Emission: monitored by observation.
Handling: observation.
Processing Time: timed how long till a batch was successfully compounded and extrusion rates.
Extrusion
Conditions: noted during the run.
Dispersion: evaluated using tape die extrusion of let down.
MFI: melt flow index of concentrate.
Specific Gravity
% Antimony Oxide
Moisture Content

VACUUM AERATED (COMPACTED) ANTIMONY TRIOXIDE

| Raw Material | Compacted Antimony Trioxide |
|---|---|
| Banbury | Oil 250° F. |
| Compounder | Batch 300 lb. |
| Extruder | Large hole die plate |
| | Temperatures |
| | 320° F. |

The batch size used here is 50 lb. more than would be normally charged to the compounder for a normal 80% loaded concentrate of antimony trioxide. When processing the first batch it seemed that 250 lb. was not sufficient charge to compound successfully, hence the increased batch size. This was determined from observations of the Banbury mixer, with the experience of the compounding team.

STANDARD (NON-COMPACTED) ANTIMONY TRIOXIDE

| Raw Material | Non-Compacted Antimony Trioxide |
|---|---|
| Banbury | Oil 250° F. |
| Compounder | Batch 300 lb. |
| Extruder | Small hole die plate |
| | Temperatures |
| | 320° F. |

In these two trials all the compounding conditions were identical, therefore, all observations made relating to the mixing process should be considered comparable.

Due to production scheduling the small hole die plate had to be put in place when processing the non-compacted antimony trioxide. It should be noted that any possible improvement in dispersion of this sample could be partially attributed to the use of the small hole die plate.

RESULTS

Dust Emission: monitored using health and safety emission equipment and observation.

To the observer it seemed very clear that the compacted material generated less dust and that the operator had less contact with that dust because of the easier handling of the bag.

Handling: observation.

Handling appeared obviously much better, the compacted bag was firmer which made it easier to cut open and balance in the feed chute. The operator could slit the bag and empty it with apparently much less physical contact with the antimony trioxide.

Processing Time: timed how long until a batch was successfully compounded, and extrusion rates.

The tables show the observations made during mixing in the Banbury compounder.

TABLE I

COMPACTED, 300 LB. BATCH, OIL 250° F.

| BATCH | START | TEMP ° F. PROCESSING | FINISH | TEMP ° F. AVGE | TIME | SEC |
|---|---|---|---|---|---|---|
| 2 | 127 | * | 140 | 134 | 2 hr 40 | 160 |
| 3 | 150 | * | 160 | 155 | 2 hr 30 | 150 |
| 4 | 160 | 153 | 158 | 157 | 1 hr 53 | 113 |
| 5 | 160 | * | * | 160 | 2 hr 25 | 145 |
| 6 | 158 | 153 | 154 | 155 | 2 hr 25 | 145 |
| 7 | 144 | 140 | 144 | 143 | 2 hr 59 | 179 |
| 8 | 147 | 144 | 150 | 147 | 3 hr 51 | 231 |
| 9 | 152 | 147 | 152 | 150 | 3 hr 30 | 210 |
| 10 | 155 | 153 | 155 | 154 | 2 hr 46 | 166 |
| 11 | 159 | 156 | 159 | 158 | 1 hr 53 | 113 |
| 12 | 164 | 159 | 159 | 161 | 2 hr 58 | 178 |
| 13 | 147 | 145 | 149 | 147 | 1 hr 53 | 113 |
| 14 | 152 | 150 | 155 | 152 | 2 hr 44 | 164 |
| 15 | 159 | 156 | 155 | 157 | 2 hr 48 | 168 |

TABLE I-continued

COMPACTED, 300 LB. BATCH, OIL 250° F.

| BATCH | TEMP ° F. START | TEMP ° F. PROCESSING | FINISH | TEMP ° F. AVGE | TIME | SEC |
|---|---|---|---|---|---|---|
| 16 | 164 | 161 | 165 | 163 | 2 hr 27 | 147 |
| 17 | 171 | 167 | 170 | 169 | 2 hr 30 | 150 |
| 18 | 172 | 167 | 173 | 171 | 2 hr 32 | 152 |

TABLE II

NON-COMPACTED, 300 LB. BATCH, OIL 250° F.

| BATCH | TEMP ° F. START | TEMP ° F. PROCESSING | FINISH | TEMP ° F. AVGE | TIME | SEC |
|---|---|---|---|---|---|---|
| 1 | 159 | 157 | 171 | 162 | 7 hr 01 | 421 |
| 2 | 169 | 165 | 166 | 167 | 4 hr 20 | 260 |
| 3 | 171 | 167 | 167 | 168 | 4 hr 37 | 277 |
| 4 | 170 | 162 | 170 | 167 | 7 hr 01 | 421 |
| 5 | 174 | 167 | 169 | 170 | 4 hr 26 | 266 |

The fastest compounding was achieved with the compacted material.
Extrusion rate for the compacted antimony trioxide started out at ≈2,000 lb/hr and dropped over time to 1,300 lb/hr. The non-compacted antimony trioxide
Extrusion was around 635 lb/hr or 10,000 lb. in 16 hours.
Dispersion: evaluated using tape die extrusion.

At least one sample from each run was evaluated for dispersion. The first two runs generated eight pallets of material in both cases and samples en from pallets 1, 3, 5, and 7.

The tape produced in the evaluation is judged by eye and is subjective. Three different observers looked at the tapes and could agree on the results without argument. The results are described as Good, Fair or Bad.

The compacted material was identified as 99001, the non-compacted material was identified as 99002. Two tests were repeated at random with the identity of the sample withheld from the analyst. The tests showed good repeatability from the observations made.

Three out of four samples from additional compacted material runs were good. Three out of four samples from the non-compacted material runs were bad. The run where the non-compacted material was processed under exactly the same compounding conditions was bad—even though the small hole die plate was in use in the extruder (this should have made dispersion better, if anything).

Specific Gravity, % Antimony Trioxide, Moisture Content

Samples were given to the quality control laboratory, the samples were from the compacted material trial of Table I, and one other compacted material trial; and from the non-compacted material trial of Table II.

| Sample | Specific Gravity | % Sb | % Moisture |
|---|---|---|---|
| P1 (99001) | 2.7 | 78.42 | 0.017 |
| P3 (99001) | 2.7 | 77.2 | 0.023 |
| P5 (99001) | 2.7 | 78.65 | 0.020 |
| P7 (99001) | 2.7 | 77.29 | 0.011 |
| P1 (99002) | 2.63 | 78.27 | 0.019 |
| P3 (99002) | 2.63 | 79.94 | 0.011 |
| P5 (99002) | 2.7 | 77.53 | 0.020 |
| P7 (99002) | 2.64 | 78.46 | 0.020 |
| P8 (99002) | 2.63 | 78.3 | 0.026 |

Conclusions

Handling and dust emission seemed to be noticeably better from practical observation.

The processing time was measured as quicker for compacted material when compared to non-compacted material under exactly the same conditions.

The dispersion of the compacted material was better than the non-compacted material when compounded under the same conditions.

EXAMPLE 5

Vacuum De-aeration of Oligomer of Tetrabromobisphenol A

A sample of phenoxy terminated carbonate oligomer of tetrabromobisphenol A (with a formula weight of about 2500) having a measured bulk density of 660 g/L was subjected to 120 g/cm$^2$ applied pressure and a vacuum of 15 inches of mercury. The fmal bulk density of the sample measured 1000 g/L. In a separate trial, the applied pressure was 1 kg/cm$^2$, the vacuum was 10 inches of mercury, and the resulting bulk density was 1100 g/L. These results indicate that the vacuum de-aeration procedure is capable of increasing the bulk density of this sample to approximately 1.7 times the original bulk density.

EXAMPLE 6

Vacuum De-aeration of Oligomer of Tetrabromobisphenol A

A sample of phenoxy terminated carbonate oligomer of tetrabromobisphenol A (with a formula weight of about 3500) having a measured bulk density of 610 g/L was subjected to 6 g/cm$^2$ applied pressure and a vacuum of 20 inches of mercury. The fmal bulk density of the sample measured 820 g/L. In a separate trial, the applied pressure was 1 kg/cm$^2$, the vacuum was 25 inches of mercury, and the resulting bulk density was 950 g/L. These results indicate that the vacuum de-aeration procedure is capable of increasing the bulk density of this sample to approximately 1.5 times the original bulk density.

EXAMPLE 7

Vacuum De-aeration of Zinc Borate

A sample of zinc borate ($3ZnO\ 2B_2O_3 \cdot 3H_2O$) having a measured bulk density of 470 g/L was subjected to a range of vacuum and mechanical pressures as in Examples 1, 5 and 6. Bulk densities ranged from 670–1380 g/L. The maximum bulk density was approximately three times the original measured bulk density.

What is claimed is:

1. A method of processing a solid, particulate polymer additive, having a particle size distribution such that at least 50% of the particles have an average particle size less than 10 μm, into a polymer comprising:
- de-aerating the particulate polymer additive to an extent such that the bulk density of the polymer additive is increased at least 50%; and
- mixing the de-aerated polymer additive into a polymer such that the polymer additive is uniformly distributed throughout the polymer.

2. The method of claim 1, wherein de-aeration does not substantially change the particle size distribution of the polymer additive.

3. The method of claim 1, wherein de-aeration is accomplished by vacuum de-aeration.

4. The method of claim 3, wherein vacuum de-aeration is achieved by disposing the polymer additive in a vessel capable of applying pressure to an upper surface of the polymer additive, while applying a vacuum to a lower surface of the polymer additive.

5. The method of claim 1, wherein the polymer additive is selected from the group consisting of a flame retardant, a flame retardant synergist, and mixtures thereof.

6. The method of claim 5, wherein the polymer additive is a flame retardant compound selected from the group consisting of hydrated minerals, halogenated organic compounds, phosphorus-containing compounds, nitrogen-containing compounds, boron-containing compounds, zinc-containing compounds, antimony-containing compounds, and mixtures thereof.

7. The method of claim 6, wherein the polymer additive is a hydrated mineral selected from the group consisting of magnesium hydroxide, alumina trihydrate and mixtures thereof.

8. The method of claim 6, wherein the polymer additive is a halogenated organic flame retardant compound selected from the group consisting of decabromodiphenyl oxide, decabromodiphenyl ethane, hexabromocyclododecane, tetrabromobisphenol A, and oligomers based upon tetrabromobisphenol A, brominated polystyrene, and tetrachlorophthalic anhydride, and mixtures thereof.

9. The method of claim 6, wherein the polymer additive is a flame retardant synergist selected from the group consisting of zinc borate, antimony trioxide, an alkali metal antimonate, and mixtures thereof.

10. The method of claim 6, wherein the polymer additive is a phosphorus-containing flame retardant compound selected from the group consisting of ammonium polyphosphate, and melamine pyrophosphate.

11. The method of claim 1, wherein at least 50% of the particles have an average particle size less than about 5 μm.

12. The method of claim 1, wherein the bulk density of the polymer additive is increased at least 100% by vacuum de-aeration.

13. The method in accordance with claim 1, wherein the polymer additive is selected from the group consisting of antimicrobial components, antioxidants, antistatic agents, blowing agents, colorants, coupling agents, heat stabilizers, light stabilizers, lubricants, plasticizers, release agents, and non-fibrous fillers.

14. The method in accordance with claim 1, wherein the particulate polymer additive is vacuum de-aerated without reducing the particle size of the additive.

15. The method in accordance with claim 1, wherein the mean particle size of the particulate polymer additive is less than about 2.0 μm.

16. The method in accordance with claim 15, wherein the mean particle size of the particulate polymer additive is about 1.0 to 1.5 μm.

17. The method of claim 13, wherein the polymer additive is selected from the group consisting of:
- an antimicrobial compound selected from the group consisting of an arsenic-containing compound; zinc pyrithione; and 2-octyl-4-isothiazoline-3-one;
- an antioxidant selected from the group consisting of a hindered phenol; butylated hydroxy toluene; tris(para-nonylphenyl)phosphite; a phosphonite; a lactone; a hydroxyl amine; a hindered amine; a thioester; carbon black; graphite; a metal powder; a quaternary amonium salt, an alkyl sulfonate; an alkyl phosphate; an alkali metal salt; an alkyl sulfonate; an ethoxylated amine; and laurel amide;
- a blowing agent selected from the group consisting of an azodicarbonamide; an inorganic carbonate; and a polycarbonic acid;
- a colorant selected from the group consisting of titanium dioxide; an azo compound; a dye; and an optical brightener;
- a coupling agent selected from the group consisting of a silane and a maleated polyolefin;
- a heat stabilizer selected from the group consisting of lead; tin; lead-barium; barium-cadmium; barium-zinc; and calcium-zinc;
- a light stabilizer selected from the group consisting of 2-hydroxy-4-methyl benzophenone; 2-(2'-hydroxy-5'methylphenyl) benzotriazole; a phenyltriazine; a hindered amine; an oxanilid; and a nickel quencher;
- a lubricant selected from the group consisting of a metallic stearate; zinc stearate; wax; polyethylene; a fatty acid; a fatty alcohol; and carnauba wax;
- a plasticizer selected from the group consisting of a phthalate; dioctyl phthalate; a linear alcohol; an aliphatic diester; and triphenyl phosphate;
- a release agent selected from the group consisting of an amide, an ester; and butyl stearate; and
- a non-fibrous filler selected from the group consisting of glass; ceramic; calcium carbonate; talc; clay; mica; wollastonite; and ground silica.

18. The method of claim 17, wherein the de-aeration is accomplished without reducing the particle size distribution of the polymer additive.

19. The method of claim 18, wherein the polymer additive is a flame retardant synergist selected from the group consisting of zinc borate, antimony trioxide, an alkali metal antimonate, and mixtures thereof.

20. The method of claim 19, wherein vacuum de-aeration is achieved by disposing the polymer additive in a vessel, and applying pressure to an upper surface of the polymer additive while applying a vacuum to a lower surface of the polymer additive.

* * * * *